United States Patent
Li et al.

(10) Patent No.: US 9,109,331 B2
(45) Date of Patent: Aug. 18, 2015

(54) FLUORESCENT BRIGHTER #71 USED FOR THE PAPERMAKING PROCESS

(71) Applicants: Meng Jun Li, Surrey (CA); Eric Ji Wei Li, Surrey (CA)

(72) Inventors: Meng Jun Li, Surrey (CA); Eric Ji Wei Li, Surrey (CA)

( * ) Notice: Subject to any disclaimer, the term of this patent is extended or adjusted under 35 U.S.C. 154(b) by 0 days.

(21) Appl. No.: 14/073,868

(22) Filed: Nov. 7, 2013

(65) Prior Publication Data

US 2015/0159331 A1 Jun. 11, 2015

(51) Int. Cl.
| | | |
|---|---|---|
| *C07D 413/10* | (2006.01) | |
| *C09K 11/06* | (2006.01) | |
| *D06L 3/12* | (2006.01) | |
| *D21H 17/07* | (2006.01) | |
| *D21H 21/30* | (2006.01) | |

(52) U.S. Cl.
CPC ............... *D21H 21/30* (2013.01); *C09K 11/06* (2013.01); *D06L 3/12* (2013.01); *D21H 17/07* (2013.01)

(58) Field of Classification Search
CPC .. C07D 403/10; C07D 413/10; D06L 3/1207; D06L 3/1228
USPC .................................... 544/193.2; 8/442, 648
See application file for complete search history.

(56) References Cited

U.S. PATENT DOCUMENTS

| | | | | |
|---|---|---|---|---|
| 7,812,156 B2 * | 10/2010 | Jackson et al. | ............. | 544/193.2 |
| 2003/0054969 A1 * | 3/2003 | Fumagalli et al. | ............. | 510/394 |

* cited by examiner

*Primary Examiner* — Venkataraman Balasubramanian

(57) ABSTRACT

Fluorescent whitening agent 71 (FB #71) 4,4'-bis[4-anilino-6-morpholino-1,3,5-triazin-2-yl]amino-2,2'-stilbene disodium salt (CAS #16090-02-1) is used on the wet-end papermaking process and coating papermaking process to increase the brightness of paper.

2 Claims, No Drawings

FLUORESCENT BRIGHTER #71 USED FOR THE PAPERMAKING PROCESS

CROSS-REFERENCE TO RELATED APPLICATIONS

In the following references of related patents, optical brighteners, optical brightening agents (OBA's) and fluorescent whitening agents (FWA's) refer to the same type of specialty chemical. The brightening chemicals present in these patents do not solve the problem of yellowing caused by overdosage of OBA/FWA. In addition, none of the patents below discuss the use of FWA #71 on the application of wet-end and coating papermaking process.

U.S. Pat. No. 7,812,156 proposes a modified OBA which maintains the high solubility and strong fluorescent whitening effects of previous OBA's while decreases the anionic load that stresses the papermaking system.

U.S. Pat. No. 7,566,349 explores the use of a new FWA of amphoteric bis-triazinylaminostilbene derivative on the process of whitening synthetic or natural organic materials such as paper. This new type of FWA is not usually suppressed in performance when put in the cationic papermaking environment or when combined with residual anionic FWA's.

U.S. Pat. No. 3,790,443 presents a technique of utilizing a water-soluble hydroxymethylaminonitrile salt in the form of dry powder on papermaking materials to quench the fluorescence of optical brightening agents present in the papermaking materials. By adding an acid along with the quencher, some undesirable whitening effects of the OBA's could be neutralized.

US20120211188 discloses the preparation techniques for a specific concentrated aqueous disulfo-stilbene based FWA for optically whitening paper.

U.S. Pat. No. 8,475,630 introduces an aromatic ring based additive that can increase the retention rate of OBA's on paper materials. By using the aromatic ring on the additive to associate with the OBA molecules chemically, capacity for retention is improved.

U.S. Pat. No. 7,789,917 reveals the composition of an amphoteric stilbene OBA, which consists of a substrate and the associated stilbene (one of 4,4'-diamino-2,2'-stilbene disulfonic acid, biarylsulfonate-4,4'-diamino-2,2'-stilbene disulfonic acid, biaryldisulfonate-4,4'-diamino-2,2'-stilbene disulfonic acid, derivatives thereof, salts thereof, and mixtures thereof).

U.S. Pat. No. 7,497,971 describes the use of a mixture of FWA's based on dicyano-1,4-bis-styrylbenzenes and bisbenzoxazoles. Such mixtures of two or more components may exhibit a higher degree of whiteness than that of the sum of the individual components alone.

U.S. Pat. No. 8,262,858 and U.S. Pat. No. 7,914,646 identify the use of oxidative agents for the paper process which enhances the performance of OBA's and chelants. By analyzing various stages of the papermaking process that involve oxidative compositions and processes that preserve and enhance the brightness and improve color of pulp or paper, it was found that the use of an oxidative agent could also reduce the photoyellowing of aged, bleached pulp materials.

U.S. Pat. No. 7,638,016 proposes a method of brightening pulp fibres with at least one stilbene-based OBA after the last bleaching/extraction stage with a chlorine based bleaching agent.

US20120199302 presents a new composition using at least two specific disulfo-stilbene based FWA for optically whitening paper or board.

U.S. Pat. No. 5,064,570 introduces a new preparation method for fluorescent brightener that involves the use of specific water-insoluble aromatic or carbon-substituted fatty alcohol auxiliaries.

EP1253191 and US 20030054969 present the composition of detergents, which includes stilbene-triazine-based optical brightener (FB #71).

CA 2576882 explores the use of stilbene-based OBA's on bleaching towers for pulp along with TAED for increasing pulp brightness.

STATEMENT REGARDING FEDERALLY SPONSORED RESEARCH OR DEVELOPMENT

Not applicable.

REFERENCE TO A SEQUENCE LISTING, A TABLE, OR A COMPUTER PROGRAM

Not applicable.

BACKGROUND OF THE INVENTION

In recent years, the consumers' pursuit for ultra-bright paper has pushed the market demands for more products with a brightness of 90-110 in ISO standards. In order to produce these ultra-high brightness products, optical brightener agents (OBA's) or fluorescent whitening agents (FWA's) must be utilized.

OBA's or FWA's have chemical properties that absorb light in the ultra-violet region (340-370 nm) and then re-emitting it back into the visible spectrum, usually in the color blue or indigo (420-470 nm). The absorption and re-emission happen at a rapid pace unlike the slow phosphorescence behaviour. The newly added blue light compensates the yellowness of paper products and produces a net whitening effect that is observable to the naked eye.

There is an ongoing need for improved brightness with low cost and with greater stability of the optical properties, i.e. decreased reversion such as yellowing (caused by overdosage), photoyellowing, and higher retention rates.

SUMMARY OF THE INVENTION

One of the biggest hurdles to using conventional FWA is the limit on overdosing, and low retention. This is especially prominent in lower brightness paper that has significant mechanical pulp present. As an increasing amount of excess conventional FWA has been input into the system, the paper materials coming off the machine would have more of a yellow tinge due to the natural appearance of the conventional FWA.

The new generation fluorescent brightener 71 (FB #71) does not encounter this problem as it has a slightly different molecular structure which exhibits an almost pure white appearance. There is a plateauing effect for brightness gain associated with injection (at which point the cost effectiveness decreases), but the paper products will no longer have a yellowish tinge. In short, the machine tender can inject as much FWA as needed to increase the brightness, without the risking yellowing caused by overdosing.

FB #71 has been historically used in the detergent industry as a brightener. However its application in papermaking process has not been successful due to the extremely low solubility in water caused by repulsions of its morpholino functional groups. Even though theoretically speaking, it is possible to be used to brighten paper, it was never commercially practical. Therefore FB #71 was not sought after by papermakers.

On the other hand, the low solubility of the FB #71 would yield a significantly higher retention rate on fibers than any other FWA's ever used in papermaking. By carefully optimizing the dosage in water of various temperatures, dissolution was achieved. FB #71 re-emits light in the range of 440-450 nm (indigo light).

The present invention relates to a novel, low-cost method of producing high final brightness values in paper production not previously achieved, and reducing brightness reversion of paper material.

According to the present invention there is provided an FWA for making high brightness paper. The usage of the FWA comprises of approximately 0.01%-1.0% by weight FB #71 based on dry weight at a temperature of 30° C.-80° C.

The invention provides several advantages over conventional FWA's:
1. Lower cost benefits due to the decreased addition of FWA while still achieving the same, or greater, ISO brightness values.
2. Increased brightness values and retention rates for paper materials over conventional FWA's. This increases the number and variety of applications for the product, significantly expanding its marketability.

The invention and its advantages will be illustrated in more detail by the examples below which however, are only intended to illustrate the invention without limiting the same. The percentage and parts stated in the description, claims and examples refer to percent by weight and parts by weight, respectively, unless otherwise stated.

DETAILED DESCRIPTION OF THE INVENTION

The invention will be further described with reference to the following non-limiting examples:

Pulp brightness (ISO brightness) is measured with a brightness meter, which determines the brightness of a split sheet at a wavelength of 457 nm (ISO D65 Standard Method).

The FWA's described in this invention are the following:
1. FB #71 has a chemical name of 4,4'-bis[4-anilino-6-morpholino-1,3,5-triazin-2-yl]amino-2,2'-stilbene disodium salt (100% purity), and a CAS number of 16090-02-1.
2. Disulfo-stilbene based FWA has a chemical name of disodium 4,4'-bis[[4-anilino-6-hydroxyethylamino-1,3,5-triazin-2-yl)amino]stilbene-2,2'-disulphonate] (100% purity), and a CAS number of 12224-06-5.
3. Tetrasulfo-stilbene based FWA has a chemical name of tetrasodium 4,4'-bis[[4-bis(2-hydroxyethyl)amino]-6-(4-sulphonatoanilino)-1,3,5-triazin-2-yl]amino]stilbene-2,2'-disulphonate] (100% purity), and a CAS number of 16470-24-9.

Example 1

Laboratory Studies

The incoming samples of 30% Kraft and 70% mechanical pulp mixture (from a pulp mill in British Columbia, Canada) with a brightness of 78 ISO and a concentration of 0.7%, was treated with three different FWA's at 40° C. and 5 minutes of retention time.

From the results shown in TABLE 1, it is evident that under the same dosage, FB #71 can obtain a significantly higher brightness value compared to the conventional FWA's when used on production that requires more mechanical pulp than Kraft pulp.

TABLE 1

| Unbleached ISO Brightness | Disulfo-OBA (%) | Tetrasulfo-OBA (%) | FB #71 (%) | ISO Brightness |
|---|---|---|---|---|
| 78 | 0.01 | 0 | 0 | 79 |
| 78 | 0.1 | 0 | 0 | 87 |
| 78 | 1.0 | 0 | 0 | 83 |
| 78 | 0 | 0.01 | 0 | 78.5 |
| 78 | 0 | 0.1 | 0 | 84 |
| 78 | 0 | 1.0 | 0 | 83 |
| 78 | 0 | 0 | 0.01 | 80 |
| 78 | 0 | 0 | 0.1 | 90 |
| 78 | 0 | 0 | 1.0 | 93 |

Example 2

Laboratory Studies

The incoming paper samples (from a paper mill in British Columbia, Canada) with a brightness of 84 ISO were coated with coating color and two different FWA's.

From the results shown in TABLE 2, it is evident that under the same dosage, FB #71 can obtain a significantly higher brightness compared to the conventional FWA's when used on production that requires coating materials.

TABLE 2

| Uncoated Basesheet Paper ISO Brightness | Tetrasulfo-OBA (%) | FB #71 (%) | Coated Paper ISO Brightness |
|---|---|---|---|
| 84 | 0.01 | 0 | 85 |
| 84 | 0.1 | 0 | 90 |
| 84 | 1.0 | 0 | 87 |
| 84 | 0 | 0.01 | 89 |
| 84 | 0 | 0.1 | 96 |
| 84 | 0 | 1.0 | 102 |

Example 3

Laboratory Studies

The incoming samples of 100% Kraft pulp (from a pulp mill in British Columbia, Canada) with a brightness of 88 ISO and a concentration of 1.0%, was treated with three different FWA's at 40° C. and 5 minutes of retention time.

From the results shown in TABLE 3, it is evident that FB #71 has a plateauing effect with whiteness as the dosage is increased, whereas the two conventional FWA's causes yellowing once overdosing occurs.

TABLE 3

| Unbleached ISO Brightness | Disulfo-OBA (%) | Tetrasulfo-OBA (%) | FB #71 (%) | ISO Brightness |
|---|---|---|---|---|
| 88 | 0.1 | 0 | 0 | 105 |
| 88 | 0.2 | 0 | 0 | 112 |
| 88 | 0.3 | 0 | 0 | 115 |
| 88 | 0.4 | 0 | 0 | 113 |
| 88 | 0 | 0.1 | 0 | 100 |
| 88 | 0 | 0.2 | 0 | 108 |
| 88 | 0 | 0.3 | 0 | 110 |
| 88 | 0 | 0.4 | 0 | 108 |
| 88 | 0 | 0 | 0.1 | 107 |

TABLE 3-continued

| Unbleached ISO Brightness | Disulfo-OBA (%) | Tetrasulfo-OBA (%) | FB #71 (%) | ISO Brightness |
|---|---|---|---|---|
| 88 | 0 | 0 | 0.2 | 116 |
| 88 | 0 | 0 | 0.3 | 120 |
| 88 | 0 | 0 | 0.4 | 123 |

Example 4

Mill-Trial

A plant test was performed at a pulp and paper mill in British, Columbia, Canada. Incoming pulp with 86 ISO brightness and a concentration of 0.7% was used to make paper products.

From the results shown in TABLE 4, it is clear that FB #71 is effective in stabilizing paper and has a high affinity for paper essential.

TABLE 4

| Unbleached ISO Brightness | Disulfo-OBA (%) | Tetrasulfo-OBA (%) | FB #71 (%) | ISO Brightness |
|---|---|---|---|---|
| 86 | 0.1 | 0 | 0 | 92 |
| 86 | 0.2 | 0 | 0 | 96 |
| 86 | 0.3 | 0 | 0 | 98 |
| 86 | 0.4 | 0 | 0 | 96 |
| 86 | 0 | 0.1 | 0 | 89 |
| 86 | 0 | 0.2 | 0 | 93 |
| 86 | 0 | 0.3 | 0 | 93 |
| 86 | 0 | 0.4 | 0 | 92 |
| 86 | 0 | 0 | 0.1 | 95 |
| 86 | 0 | 0 | 0.2 | 100 |
| 86 | 0 | 0 | 0.3 | 105 |
| 86 | 0 | 0 | 0.4 | 108 |

What is claimed is:

1. A fluorescent whitening application on the wet-end papermaking process, applying 0.01%-1.0% by weight of Fluorescent Whitening Agent of formula 4,4'-bis[4-anilino-6-morpholino-1,3,5-triazin-2-yl]amino-2,2'-stilbene disodium salt (CAS 1609-02-1) on paper, with light re-emitting in the range of 440-450 nm, at an optimal operation temperature of 30-80° C., with a retention time of 5 minutes, and achieving up to 22 ISO Brightness points at 1% weight concentration, without yellowing caused by overdosing.

2. Application in claim 1, in which the wet-end papermaking process is coating paper-making process achieving up to 18 ISO Brightness points at 1% weight concentration.

* * * * *